US012650771B2

(12) United States Patent
Segev et al.

(10) Patent No.: US 12,650,771 B2
(45) Date of Patent: Jun. 9, 2026

(54) HOST BANDWIDTH LIMITED SSDS WITH HIGH-RATE NANDs

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 138 days.

(21) Appl. No.: 18/442,580

(22) Filed: Feb. 15, 2024

(65) Prior Publication Data

US 2025/0264995 A1      Aug. 21, 2025

(51) Int. Cl.
*G06F 3/00* (2006.01)
*G06F 3/06* (2006.01)

(52) U.S. Cl.
CPC .......... *G06F 3/0613* (2013.01); *G06F 3/0634* (2013.01); *G06F 3/0679* (2013.01)

(58) Field of Classification Search
CPC ..... G06F 3/0613; G06F 3/0634; G06F 3/0679
See application file for complete search history.

(56) References Cited

U.S. PATENT DOCUMENTS 9,164,680 B2    10/2015  Seroff et al.
9,734,911 B2     8/2017  Sinclair et al.

10,409,512 B2 *  9/2019  Kim ...................... G06F 3/0659
11,113,222 B2    9/2021  Law
11,675,528 B2    6/2023  Yadav et al.
2003/0097518 A1 *  5/2003  Kohn .................. G06F 12/0813
                                                709/212
2016/0342539 A1 * 11/2016  Bains ...................... G06F 13/16

FOREIGN PATENT DOCUMENTS

WO      WO2011081089      7/2011

* cited by examiner

*Primary Examiner* — Craig S Goldschmidt
(74) *Attorney, Agent, or Firm* — Patterson + Sheridan, LLP

(57)      ABSTRACT

When the overall NAND bandwidth exceeds the bandwidth of a host device, back pressure builds and the full potential of the NAND is not utilized. This back pressure may be relieved by NAND arbitration, where a device controller selects and interleaves different sets of NANDs over the course of subsequent states. The number of NANDs that participate in this arbitration depends on the host speed to NAND speed ratio. At each state, different sets of NAND are selected by exchanging NANDs that were used in a previous state with NANDS that were not used in a previous state in an interleaving manner. At each state, a pre-determined amount of data will be sent to the selected set of NAND. Once the device determines that all the NANDs participating in the arbitration are ready to be programmed, the device will program the NANDs.

20 Claims, 7 Drawing Sheets

500

Set Base (B) = 0
Determine Number of
NANDS (N)
502

Check S = NAND speed
Check H = Host speed
504

Calculate number of active NANDS (A)
A = MIN(N, H/S)
506

Set C(current) = 0
508

Internal Program Loop
530

Send 4KB data
510

Send Data to FIM: (C+B)%N
Update C=(C+1)%A
512

Time to
Program?
514

NO

YES

Program the NANDs & Update B:
B = (B + A)%N
520

700

HOST BANDWIDTH LIMITED SSDS WITH HIGH-RATE NANDs

BACKGROUND OF THE DISCLOSURE

Field of the Disclosure

Embodiments described herein generally relate to an improved NAND arbitration scheme for SSDs.

Description of the Related Art

Various types of non-volatile memory (NVM), such as flash memory (e.g., NAND flash memory), can be used for mass storage. Memory controllers can be used to perform access requests (e.g., program, read, erase operations) and memory management functions on NVM. In typical NVM systems, a single memory controller can access multiple units of NVM, such as multiple memory dies (e.g., NAND flash memory dies), over a shared bus. Memory controllers can also communicate with a host device through an interface and over a communications channel (e.g., a bus). Typical shared bus communication systems can suffer from signal integrity problems, especially as the number of memory elements connected by the bus increases.

Currently, there are instances where the NAND flash memory can sustain higher throughput than what a host device can provide. In these scenarios, the full potential of the NAND flash memory is not utilized. Data writes may have to be paused in the middle of a page when there is insufficient incoming data from the host device. This causes significant performance degradation.

There is a need in the art for an improved NAND arbitration scheme for writing to host limited bandwidth systems.

SUMMARY OF THE DISCLOSURE

When the overall NAND bandwidth exceeds the bandwidth of a host device, back pressure builds and the full potential of the NAND is not utilized. This back pressure may be relieved by NAND arbitration, where a device controller selects and interleaves different sets of NANDs over the course of subsequent states. The number of NANDs that participate in this arbitration depends on the host speed to NAND speed ratio. At each state, different sets of NAND are selected by exchanging NANDs that were used in a previous state with NANDS that were not used in a previous state in an interleaving manner. At each state, a pre-determined amount of data will be sent to the selected set of NAND. Once the device determines that all the NANDs participating in the arbitration are ready to be programmed, the device will program the NANDs.

In one embodiment, a data storage device comprises: a memory device comprising a plurality of memory elements; and a controller coupled to the memory device, wherein the controller is configured to: determine a first host speed to memory element speed ratio; select a first set of memory elements of the plurality of memory elements at a first state based on the first host speed to memory element speed ratio; determine a second host speed to memory element speed ratio; and select a second set of memory elements of the plurality of memory elements at a second state based on the second host speed to memory element speed ratio, wherein the second set of memory elements is different from the first set of memory elements.

In another embodiment, a data storage device comprises: a memory device comprising a plurality of memory elements; and a controller coupled to the memory device, wherein the controller is configured to: determine at least one memory element of the plurality of memory elements that will participate in arbitration; calculate a host speed to memory element speed ratio; calculate a number of active memory elements, wherein the number of active memory elements is a number of memory elements equal to a full bandwidth of a host; select a first set of memory elements of the plurality of memory elements at a first state from the at least one memory element that will participate in arbitration, wherein the number of memory elements in the first set is equal to the number of active memory elements; send data to the first set of memory elements; program the first set of memory elements; and select a second set of memory elements at a second state.

In another embodiment, a data storage device comprises: means to store data; and a controller coupled to the means to store data, wherein the controller is configured to: determine a plurality of memory elements of the means to store data that will participate in arbitration; select a first set of memory elements at a first state from the plurality of memory elements that will participate in arbitration; send data to the first set of memory elements at a pre-determined interval; select a second set of memory elements at a second state from the plurality of memory elements, the second set of memory elements comprising at least one memory element not included in the first set of memory elements; send data to the second set of memory elements at the pre-determined interval; determine whether the plurality of memory elements that participated in arbitration are ready to be programed; and program the plurality of memory elements that participated in arbitration.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

When the overall NAND bandwidth exceeds the bandwidth of a host device, back pressure builds and the full potential of the NAND is not utilized. This back pressure may be relieved by NAND arbitration, where a device controller selects and interleaves different sets of NANDs over the course of subsequent states. The number of NANDs that participate in this arbitration depends on the host speed to NAND speed ratio. At each state, different sets of NAND are selected by exchanging NANDs that were used in a previous state with NANDS that were not used in a previous state in an interleaving manner. At each state, a pre-determined amount of data will be sent to the selected set of NAND. Once the device determines that all the NANDs participating in the arbitration are ready to be programmed, the device will program the NANDs.

It is to be understood that while reference is made to NAND memory devices, the memory devices are not limited to NAND. Rather, NAND memory devices are simply the exemplified memory devices. Aspects of the disclosure are equally applicable to other memory devices such as NOR memory devices.

Figure 1:
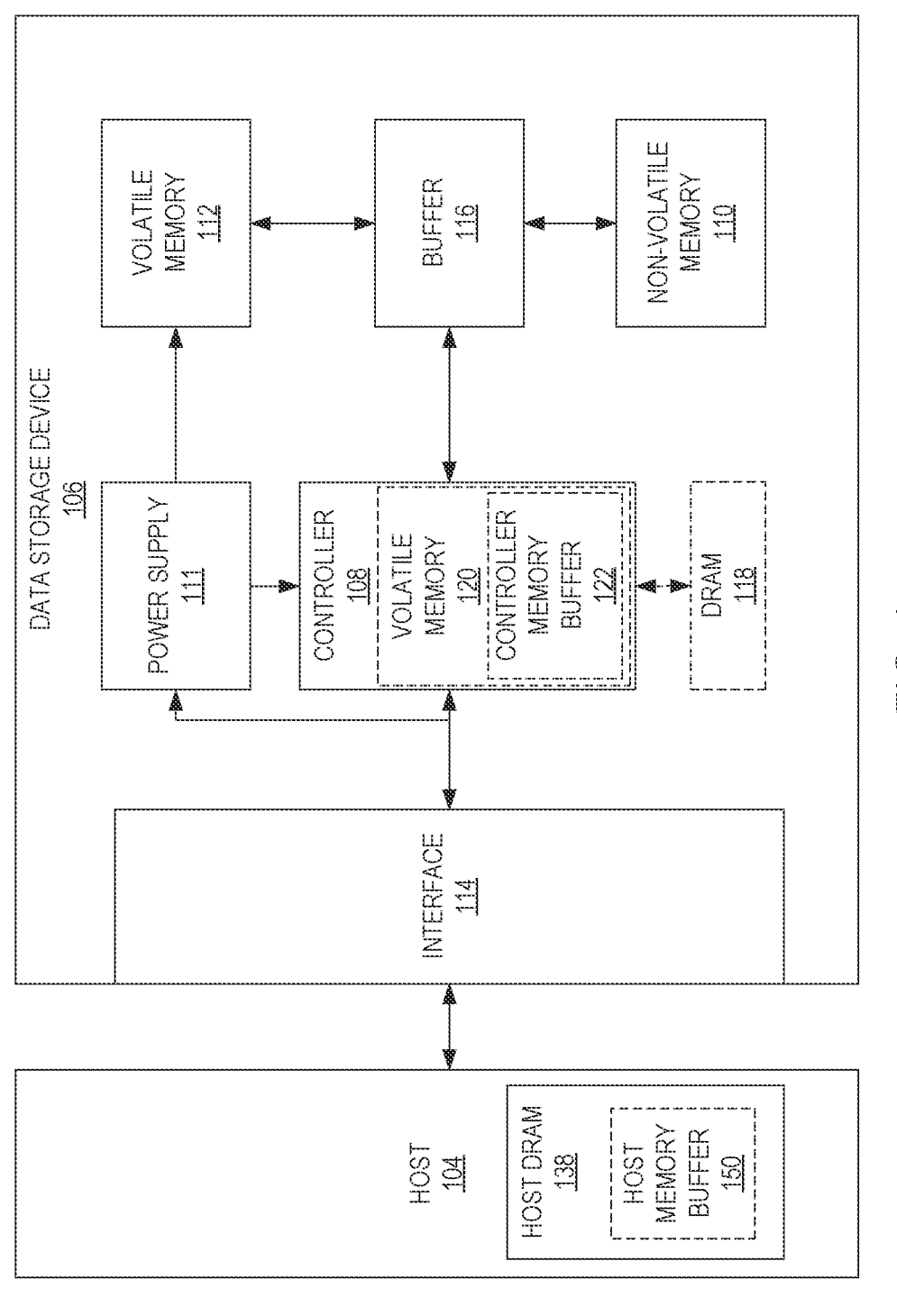
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVMe Flash memory devices may include NAND or NOR-based flash memory devices and may store data based on a charge contained in a floating gate of a transistor for each flash memory cell. In NVMe flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVMe cells. Rows of NVMe cells may be electrically connected using a word line to define a page of a plurality of pages. Respective cells in each of the plurality of pages may be electrically connected to respective bit lines. Furthermore, NVMe flash memory devices may be 2D or 3D devices and may be single level cell (SLC), multi-level cell (MLC), triple level cell (TLC), or quad level cell (QLC). The controller 108 may write data to and read data from NVMe flash memory devices at the page level and erase data from NVMe flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
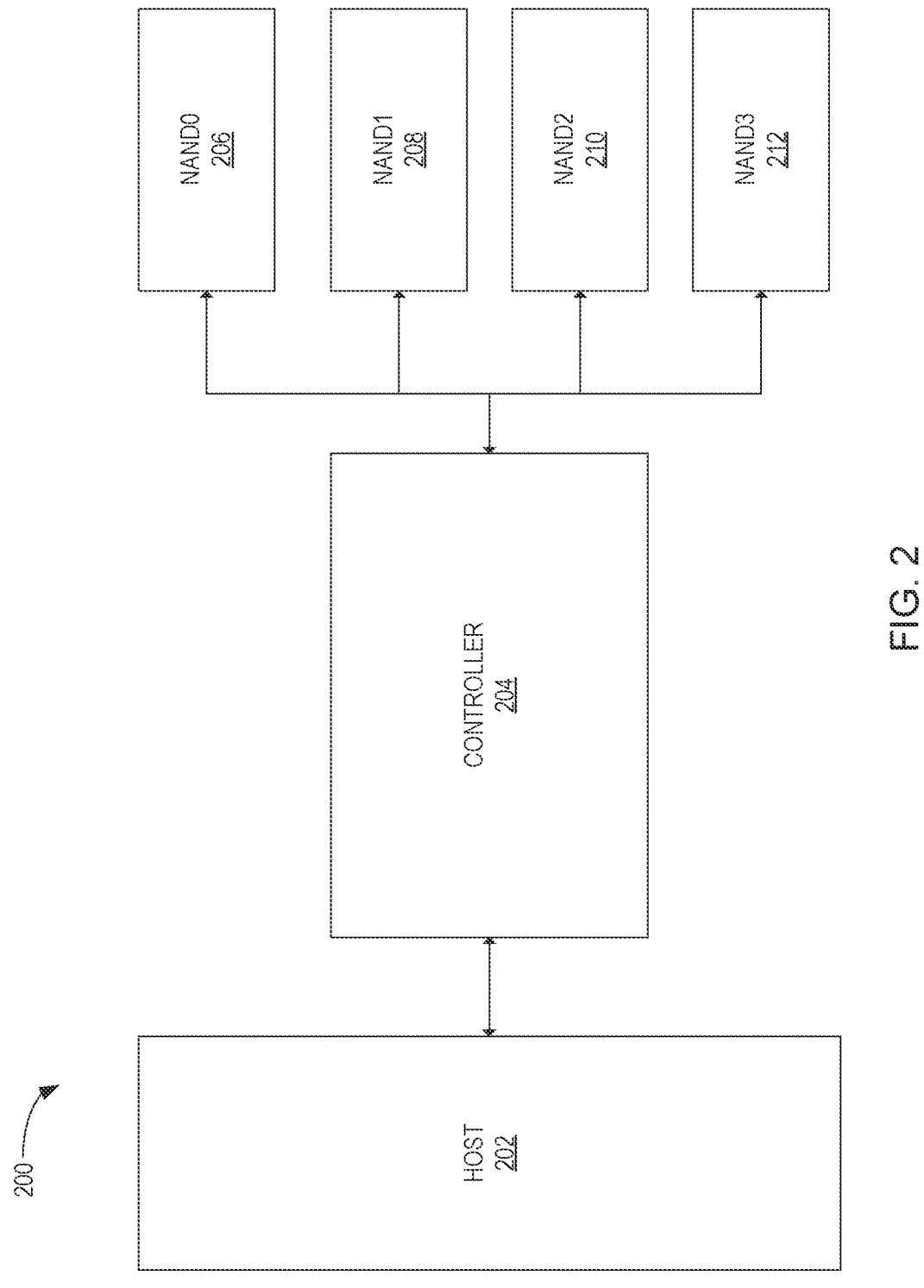
FIG. 2 is a schematic illustration of a NAND system, according to one embodiment.

FIG. 2 is a schematic illustration of a NAND system 200, according to one embodiment. The NAND system 200 comprises a host device 202, a controller 204, and four NANDs: NAND0 206, NAND1 208, NAND2 210, and NAND3 212. In other embodiments, NAND system 200 comprises more than 4 NANDs or at least 2 NANDs. Though not depicted in FIG. 2, controller 204 is conventionally included in a data storage device, such as data storage device 106 of FIG. 1.

Figure 3:
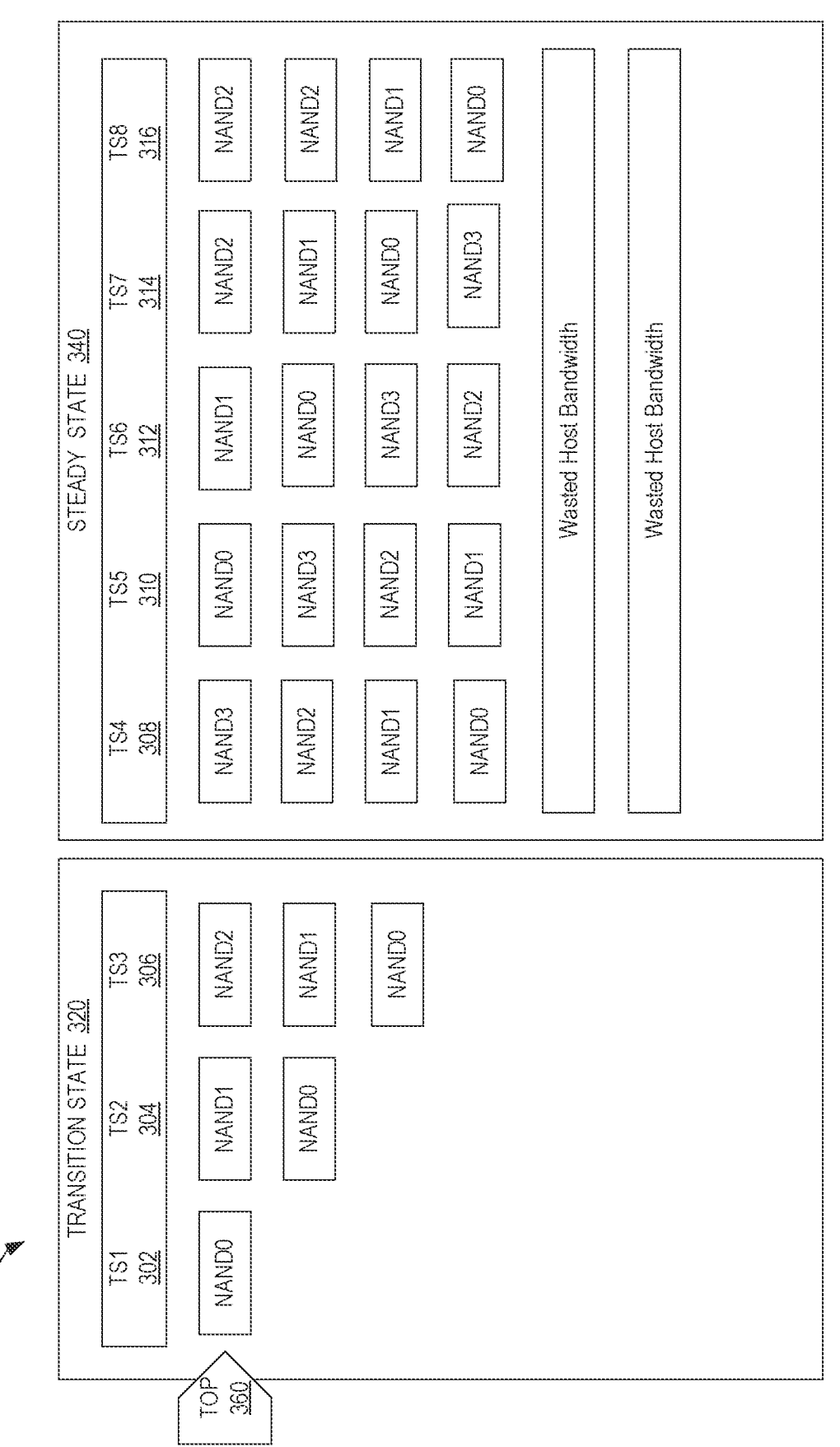
FIG. 3 is a schematic illustration of an interleaving NAND limited NAND arbitration scheme, according to another embodiment.

FIG. 3 is a schematic illustration of an interleaving NAND limited NAND arbitration scheme 300, according to another embodiment. The NAND arbitration scheme 300 may be executed by a controller of a NAND system, such as controller 204 of FIG. 2. Additionally, the NAND arbitration scheme 300 may be implemented in scenarios where a host can support the speed and bandwidth of all the NANDs in a NAND system. In a NAND limited system, the overall bandwidth of the NANDs is less than the bandwidth of the host (i.e., a NAND limited system). Thus, the full potential of the NANDs may be utilized and there is no back pressure in the NAND system. The exemplary NAND system of FIG. 3 comprises four NANDS: NAND0, NAND1, NAND2, and NAND3. Whereas, the exemplary host device of FIG. 3 can support a bandwidth speed for six NANDS.

The NAND arbitration scheme 300 includes a transition state 320 and a steady state 340. The transition state 320 comprises several time slots, for example, time slot 1 (TS1) 302, time slot 2 (TS2) 304, and time slot 3 (TS3) 306. During the transition state 320 (i.e., TS1 to TS3), NANDs of the system start to fill the host bandwidth pipeline. The steady state 340 comprises several time slots, for example, time slot 4 (TS4) 308, time slot 5 (TS5) 310, time slot 6 (TS6) 312, time slot 7 (TS7) 314, and time slot 8 (TS8) 316. During the steady state 340 (i.e., TS4 to TS8), all the NANDs are in the host pipeline and are busy. In some embodiments, the host will send data at full bandwidth to the NANDs in the pipeline. At TS1 302, since NAND0 is the only NAND in the pipeline the host will send data at full bandwidth to NAND0, and the first portion of data is written to NAND0. At TS2 304, NAND1 is added to the pipeline (i.e., NAND1 and NAND0 are in pipeline). Thus, at TS2 304, half (½) of the full bandwidth of the host will be sent to NAND1 and NAND0, respectively. At TS2 304, while NAND0 is busy, the second portion of the data is written to NAND1. At TS3 306, a third (⅓) of the full bandwidth of the host will be sent to each of NAND2, NAND1, and NAND0, and so forth.

During the steady state 340, all four NANDs of the exemplary NAND system of FIG. 3 are in the pipeline. However, because the exemplary host device of FIG. 3 has a bandwidth speed of six NANDs, the NAND arbitration scheme 300 will not run against the bandwidth speed limit of the host. Instead, the remaining availability in the host pipeline for a fifth and sixth NAND are considered wasted host bandwidth. In the top line 360 of the host pipeline, one-sixth (⅙) of the host bandwidth goes to NAND0 (at TS1 302), NAND1 (at TS2 304), NAND2 (at TS3 306), then to NAND3 (at TS4 308), and back to NAND0 (at TS5 310) in a cyclic manner. In the lines below top line 360, NAND0, NAND1, NAND2, and NAND3 cycle in a similar manner but are shifted over by one time slot. Accordingly, the NANDs in the pipeline are interleaved relative to the NANDs in preceding time slots. The remaining potential spots (i.e., for a fifth and sixth NAND) in the host pipeline are not used (i.e., wasted) since all four NANDs of the exemplary NAND system of FIG. 3 are busy with data transfers.

In certain embodiments, when all NANDs become busy (during steady state) the device cannot sustain the full bandwidth allowed by the host, and back pressure beings. In this scenario, when NAND0 becomes un-busy, NAND0 can restart working on another set of data. This principle applies to all NANDs in the system. As a result, this interleaved nature allows all NANDs to be busy at all times, which increases maximum performance.

Figure 4:
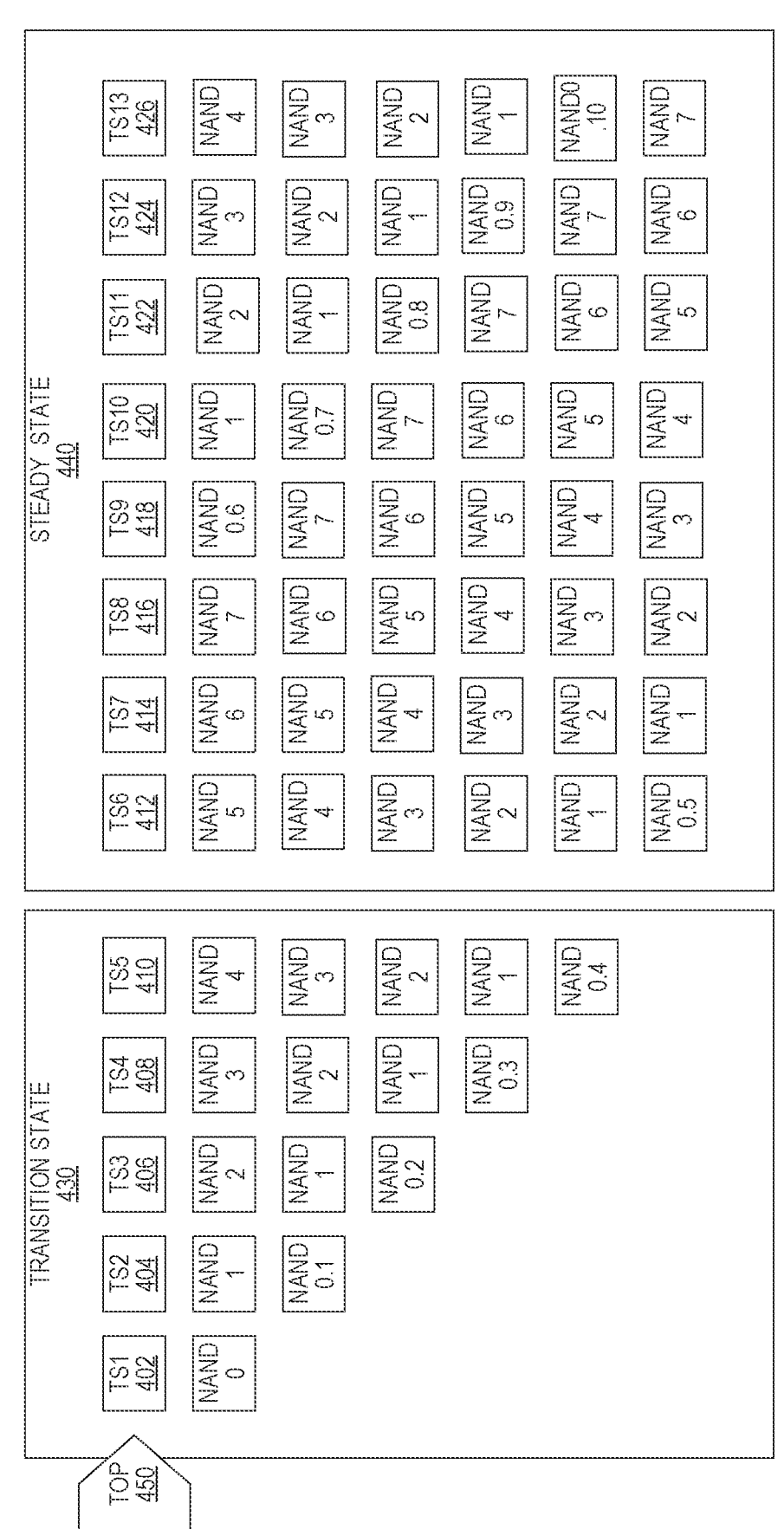
FIG. 4 is a schematic illustration of an interleaving host limited NAND arbitration scheme, according to another embodiment.

FIG. 4 is a schematic illustration of an interleaving host limited NAND arbitration scheme 400, according to another embodiment. The NAND arbitration scheme 400 may be executed by a controller of a NAND system, such as controller 204 of FIG. 2. NAND arbitration scheme 400 may be implemented in scenarios where a host cannot support the speed and bandwidth of all the NANDs in the NAND system. In NAND arbitration scheme 400, the overall bandwidth of the NANDs is greater than the bandwidth and speed of the host (i.e., a host limited system). As a result, the full potential of the NANDs are not fully utilized and there is back pressure in the NAND system. The exemplary NAND system of FIG. 4 comprises eight NANDs: NAND0, NAND1, NAND2, NAND3, NAND4, NAND5, NAND6, and NAND7. Whereas, the exemplary host device of FIG. 4 can support a bandwidth speed of six NANDs.

The NAND arbitration scheme 400 includes a transition state 430 and steady state 440. The transition state 430 comprises several time slots, for example: time slot 1 (TS1) 402, time slot 2 (TS2) 404, time slot 3 (TS3) 406, time slot 4 (TS4) 408, and time slot 5 (TS5) 410. During the transition state 430 (i.e., TS1 to TS5), NANDs of the system start to fill the host pipeline. The steady state 440 comprises several time slots, for example: time slot 6 (TS6) 412, time slot 7 (TS7) 414, time slot 8 (TS8) 416, time slot 9 (TS9) 418, time slot 10 (TS10) 420, time slot 11 (TS11) 422, time slot 12 (TS12) 424, and time slot 13 (TS13) 426. During the steady state 440 (i.e., TS6 to TS13), all the NANDs in the host pipeline and are busy. At each time slot, the host will send data to the set of active NANDs (i.e., the set NANDs in the pipeline during the time slot) at pre-determined intervals. In certain embodiments, the pre-determined interval is 4 KB. In FIG. 4, the various expressions of NAND0 (i.e., NAND0.1, NAND0.2, NAND0.3, and so on) indicate the number of pre-determined intervals of data sent to NAND0 over several time slots. For example, at TS1 402, the host sends the first 4 KB to NAND0. At TS2 404, the host sends the second 4 KB to NAND0.1. At TS3 406, the host sends the third 4 KB to NAND0.2, and so on. At TS7 414 and TS8 416, between NAND0.5 and NAND0.6, there is pause. NAND0 is not an active NAND (i.e., NAND0 is not part of the set of NAND in the pipeline during TS7 or TS8), and the host does not send data to NAND0. At TS9 418, the host resumes sending data to NAND0 (i.e., NAND0.6).

In some embodiments, the host will send data at full bandwidth to the NANDs in the pipeline. At TS1 302, since NAND0 is the only NAND in the pipeline the host will send data at full bandwidth to NAND0, and the first portion of data is written to NAND0. At TS2 304, NAND1 is added to the pipeline (i.e., NAND1 and NAND0 are in pipeline). Thus, at TS2 304, half (½) of the full bandwidth of the host will be sent to NAND1 and NAND0, respectively. Furthermore, at TS2 304, while NAND0 is busy, the second portion of the data is written to NAND1. At TS3 306, a third (⅓) of the full bandwidth of the host will be sent to each of NAND2, NAND1, and NAND0, and so forth.

During the steady state 440, all eight NANDs of the exemplary NAND system of FIG. 4 will participate in arbitration. However, the exemplary host device of FIG. 4 only has a speed for supporting six NANDs. At any given point during the steady state 440, there is only space for six NANDs in the host pipeline because the host cannot provide more data. In this scenario, the bandwidth of the overall NANDs is greater than the speed of the host, which results in a back pressure in the NAND system (i.e., a NAND limited system). As a result, NAND arbitration scheme 400 will interleave different sets of NAND at each time slot to obtain maximum performance from the NANDs. For example, all NANDs that participate in arbitration fill top line 450, each NAND at a different time slot. The host will send 4 KB to each NAND as each NANDs rotates through the time slots in a cyclic manner. In the lines below the top line 450, the NANDs rotate in a similar manner but shifted over by one time slot. Accordingly, the NANDs that will participate in arbitration are interleaved and active NANDs are exchanged with unused or idle NANDs (i.e., NANDs that were previously on pause in a prior time slot) so that each subsequent time slot has a different set of active NAND.

In certain embodiments, pausing in the middle of a page (i.e., 16 KB) causes major degradation in NAND performance, since the NAND is expecting to receive each page (4 multiplied by 4 KB) in a consecutive manner. As will be discussed below, an improved interleaving NAND arbitration scheme allows the host to send at least 16 KB to a NAND participating in arbitration without pausing in the middle of the page. Thus, the degradation incurred by stopping in the middle of a page is avoided and maximum performance from the NANDs is achieved.

In another embodiment, NVMe SSDs working with Gen5×4 can maintain a maximum of around 15 GB/sec bandwidth. Additionally, working with 16 NANDs packages can sustain around 24 GB/sec bandwidth. Such setups are also considered host limited, since the host side (PCIe) limits the actual throughput of the device.

Figure 5:
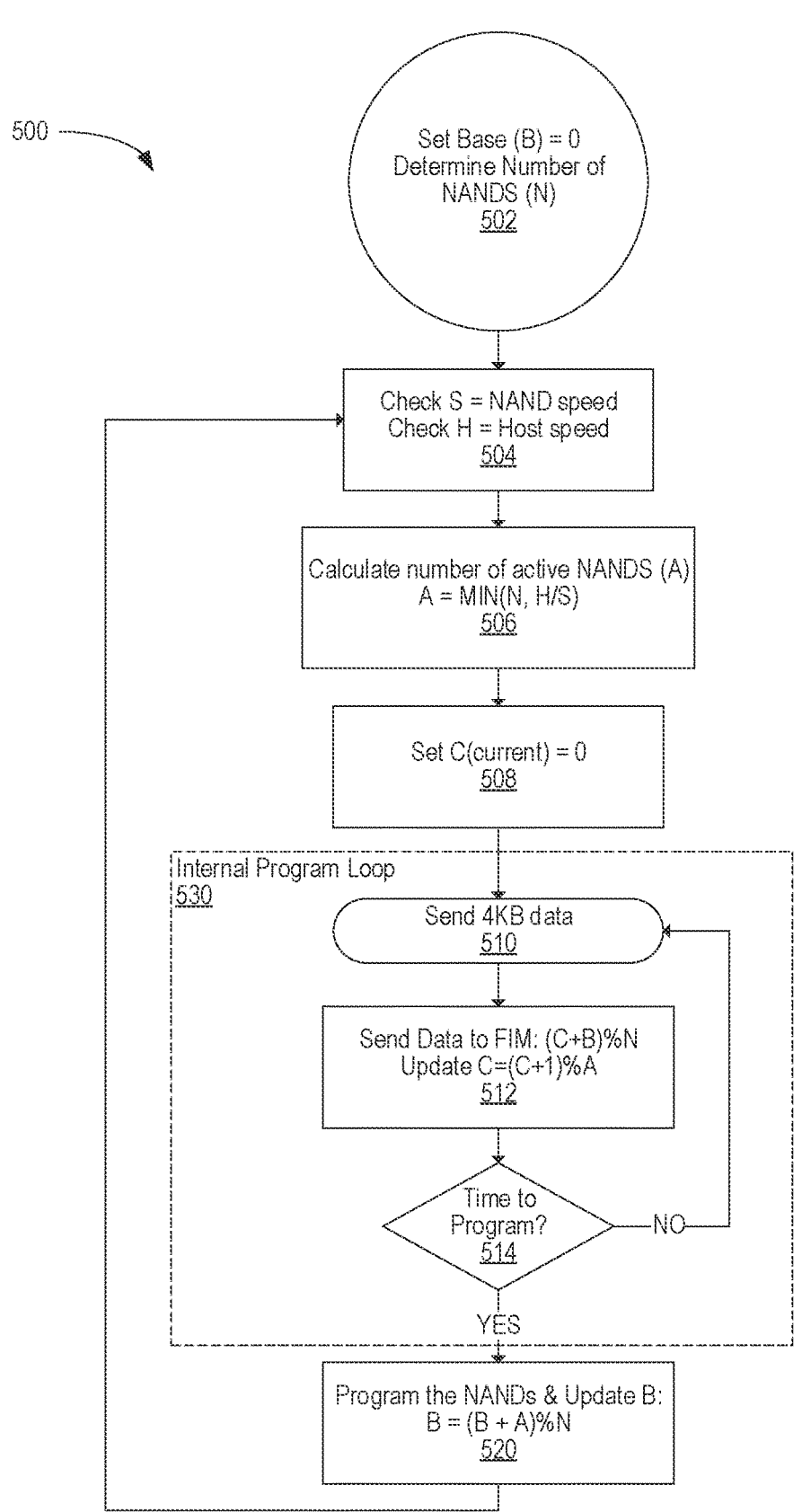
FIG. 5 is a flowchart illustrating an interleaving host limited NAND arbitration scheme, according to another embodiment.

FIG. 5 is a flowchart illustrating an interleaving host limited NAND arbitration scheme 500, according to another embodiment. At starting block 502, the controller, such as controller 108 of FIG. 1 or controller 204 of FIG. 2, sets the base (B) to 0, B is the identifying NAND number of the first NAND that will participate in arbitration (i.e., the first NAND that will participate in arbitration is NAND0, thus B is 0). The controller will also determine the number of NANDs (N) that will participate in arbitration. At block 504, the controller checks the NAND speed(S) and the host speed (H). The NAND speed and host speed may vary during power saving flows; therefore, the controller will routinely check the NAND speed and host speed. At block 506, the controller calculates the number of active NANDs (A): A=min (N, H/S). The number of active NANDs is the number of NANDs equal to the full host bandwidth. At block 508, the controller sets the value marking the starting point of arbitration (C) to 0, marking the starting point of arbitration.

Blocks 510, 512, and 514 are part of an internal program loop 530. At 510, the controller sends 4 KB of data to the active NANDs (i.e., the set of NAND that are in of the host pipeline). At block 512, the controller updates the value which marks the starting point of arbitration (C): C=(C+1)% A. At block 512, the controller also calculates the NAND where data is sent: (C+B) % N, the controller then sends the data to the calculated flash interface manager (FIM). At block 514, the controller determines if the NANDs participating in arbitration are ready to be programmed. The NANDs participating in arbitration are ready to be programmed if a pre-determined amount of data has been received for each NAND. If a pre-determined amount of data has not been received, the loop 530 loops back to block 510, where the controller will sent an additional 4 KB of data to the NAND. If all the NAND have received the pre-determined amount of data, then, at block 520, the controller will program the NANDs and update base (B) where B=(B+ A) % N. After block 520, the controller will return to block 504 and check the NAND speed (S) and host speed (H).

Figure 6:
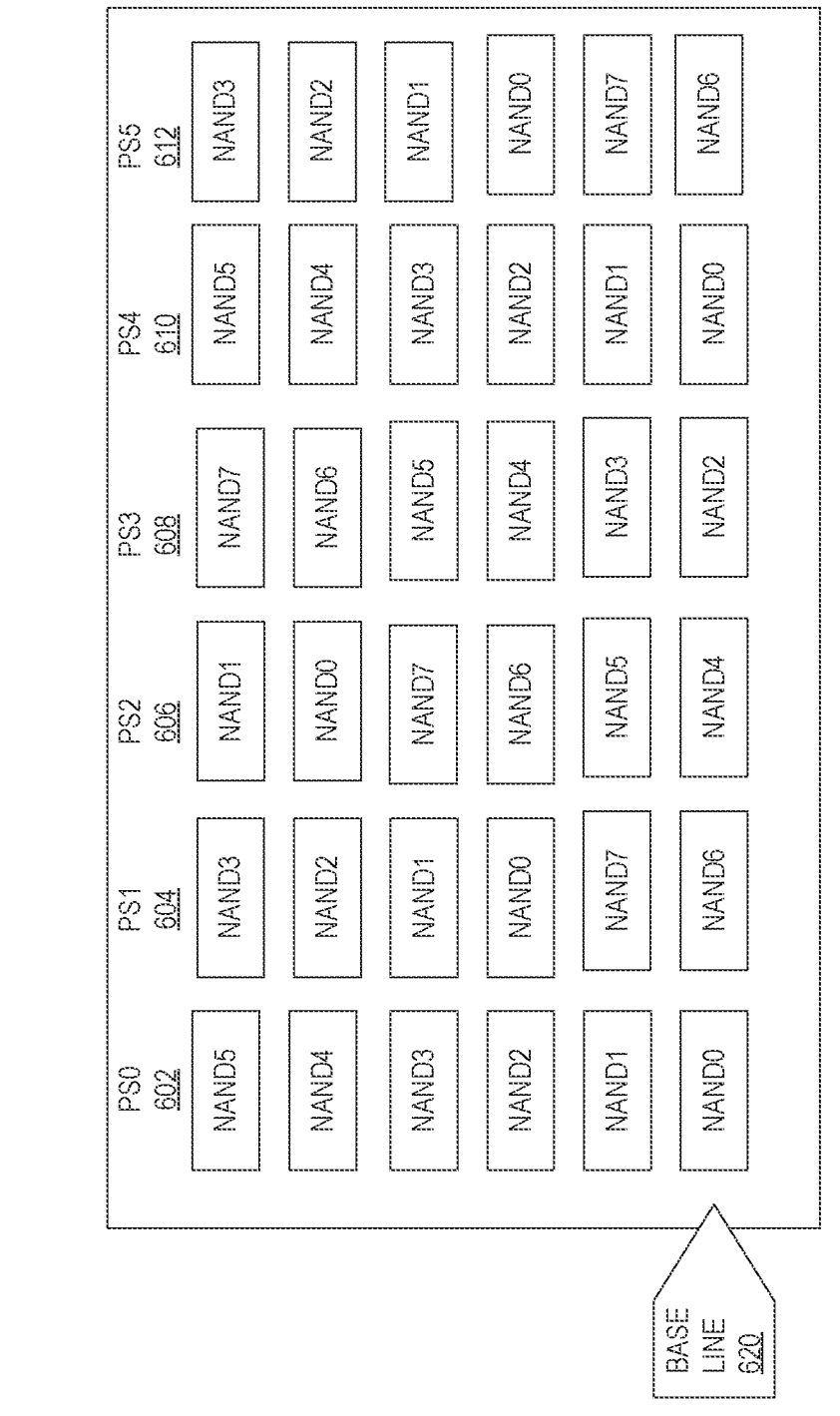
FIG. 6 is a schematic illustration of an interleaving host limited NAND arbitration scheme, according to another embodiment.

FIG. 6 is a schematic illustration of an interleaving host limited NAND arbitration scheme 600, according to another embodiment. The NAND arbitration scheme 600 may be executed by a controller of a NAND system, such as controller 204 of FIG. 2. NAND arbitration scheme 600 may be implemented in scenarios where a host cannot support the speed and bandwidth of all the NANDs in the NAND system. In NAND arbitration scheme 600, the overall bandwidth of the NANDs is greater than the bandwidth of the host (i.e., a host limited system). As a result, the full potential of the NANDs are not fully utilized and there is back pressure in the NAND system. The exemplary NAND system of FIG. 6 comprises eight NANDS: NAND0, NAND1, NAND2, NAND3, NAND4, NAND5, NAND6, and NAND7. Whereas, the exemplary host device of FIG. 6 can support a bandwidth speed of six NANDS.

The NAND arbitration scheme 600 comprises program slots 0 (PS0) 602, program slot 1 (PS1) 604, program slot 2 (PS2) 606, program slot 3 (PS3) 608, program slot 4 (PS4) 610, and program slot 5 (PS5) 612. In the first PS0 602, a first set of NAND comprising NAND0, NAND1, NAND2, NAND3, NAND4, and NAND5 is used. After PS0 602, because the initial base (B) was set to 0, the number of active NANDs (A) is 6, and the number of NANDs is 8 the controller will update base (B) to 6 (i.e., B=(B+A) % N, where B=(0+6)% 8), which identifies NAND6 as the first NAND that will participate in arbitration at PS1 604. In PS1 604, a second set of NAND comprising NAND6, NAND7, NAND0, NAND1, NAND2, and NAND3 is used. After PS1 604, the controller will update base (B) to 4 (i.e. B=(6+6)% 8), which identifies NAND4 as the first NAND that will participate in arbitration at PS2 606. In PS2 606, a third set of NAND comprising NAND4, NAND5, NAND6, NAND7, NAND0, and NAND1 is used. After PS2 606, the controller will update base (B) to 2 (i.e. B=(4+6)% 8), which identifies NAND2 as the first NAND that will participate in arbitration at PS3 608. In PS3 608, a fourth set of NAND comprising NAND2, NAND3, NAND4, NAND5, NAND6, and NAND7 is used. After PS3 608, the controller will update base (B) to 0 (i.e, B=(2+6)% 8), which identifies NAND0 as the first NAND that will participate in arbitration at PS4 610. The fifth set of NAND used in PS4 will be the same as the first set of NAND used in PS0, and so on. The updated base (B) is the identifying NAND number of the first NAND that will participate in arbitration in the next program slot of base line 620. Inside each program slot, the controller will continue arbitrating at 4 KB intervals per active NANDs. Thus, the device controller will select a different set of NAND to fill each program slot with data based on the NANDs and the host speed ratio. This prevents back pressure on the NAND bus due to low host speed.

Figure 7:
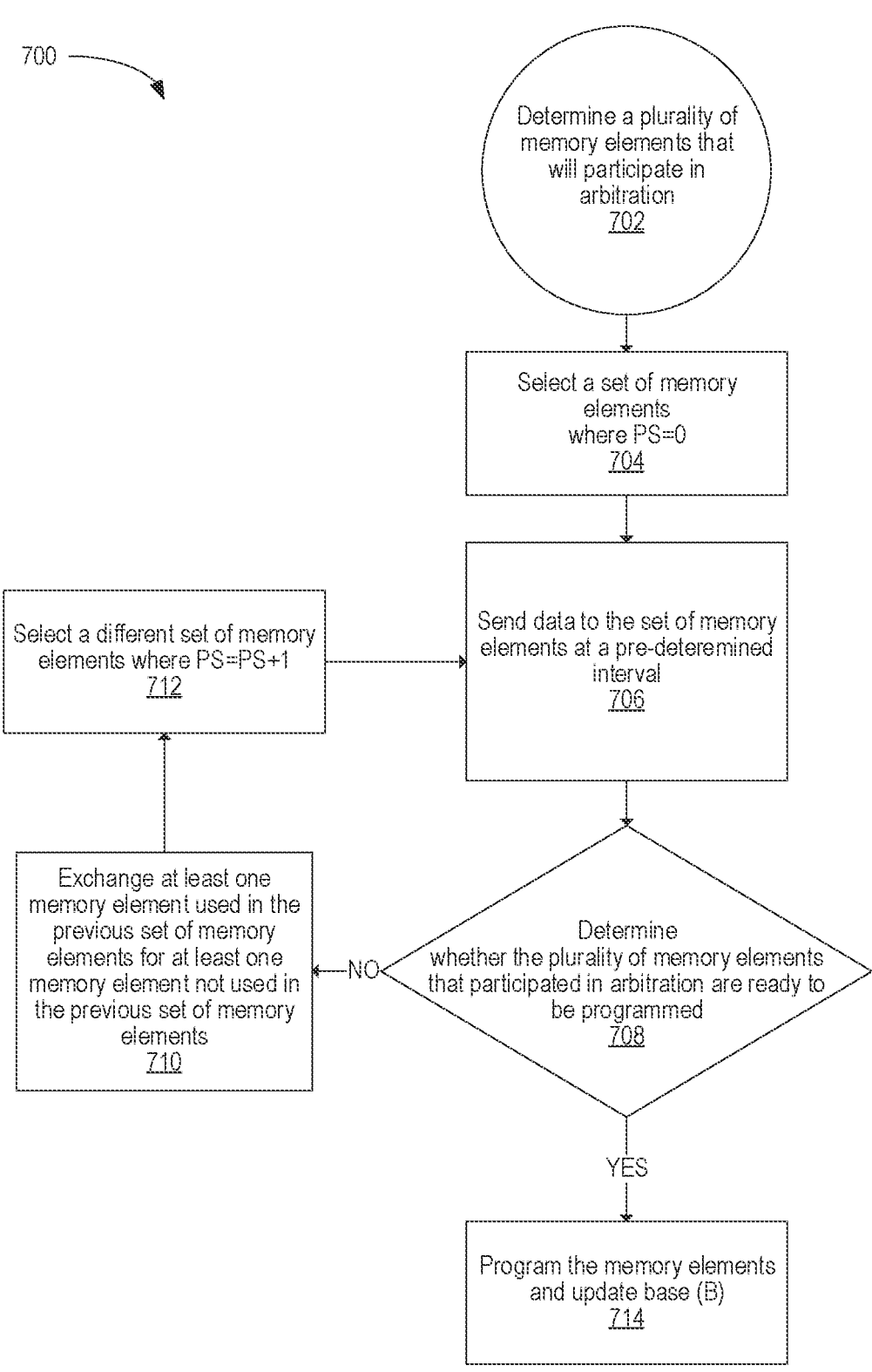
FIG. 7 is a flowchart illustrating an interleaving host limited NAND arbitration scheme, according to another embodiment.

FIG. 7 is a flowchart illustrating an interleaving host limited NAND arbitration scheme 700, according to another embodiment. The NAND arbitration scheme 700 may be executed by a controller of a NAND system, such as controller 204 of FIG. 2. At block 702, the controller determines a plurality of memory elements (e.g. NAND) that will participate in arbitration. At block 704, the controller selects a set of memory elements, where program slot is 0 (i.e., the first program slot is at PS0). At block 706, the controller sends data to the set of memory elements at a pre-determined interval. At block 708, the controller determines whether the plurality of memory elements that participated in arbitration are ready to be programmed. If the plurality of memory elements are ready to be programmed, then at block 714, the controller programs the memory elements and updates the base (B) value. If the plurality of memory elements are not ready to be programmed, then the controller, at block 710, will exchange at least one memory element used in a set of memory elements from a previous program slot for at least one memory element not used in a set of memory elements from a previous program slot. At block 712, the controller will select a different set of memory elements, where the program slot is updated and the updated program slot is the program slot increased by one (i.e., PS=PS+1).

When the overall NAND bandwidth exceeds the bandwidth of a host device, back pressure in the NAND system increases and the full potential of the NAND is not utilized. This back pressure may be relieved by NAND arbitration, where a device controller selects and interleaves different sets of NANDs over the course of subsequent states. The number of NANDs that participate in this arbitration depends on the host speed to NAND speed ratio. At each state, different sets of NAND are selected by exchanging NANDs that were used in a previous state with NANDS that were not used in a previous state in an interleaving manner. At each state, a pre-determined amount of data will be sent to the selected set of NAND. Once the device determines that all the NANDs participating in the arbitration are ready to be programmed, the device will program the NANDs.

In one embodiment, a data storage device comprises: a memory device comprising a plurality of memory elements; and a controller coupled to the memory device, wherein the controller is configured to: determine a first host speed to memory element speed ratio; select a first set of memory elements of the plurality of memory elements at a first state based on the first host speed to memory element speed ratio; determine a second host speed to memory element speed ratio; and select a second set of memory elements of the plurality of memory elements at a second state based on the second host speed to memory element speed ratio, wherein the second set of memory elements is different from the first set of memory elements. The memory elements are NAND. The second set of memory elements interleaves the first set of memory elements. The interleaving of the first set of memory elements is cyclical. The controller is further configured to select sets of memory elements at subsequent states based on corresponding host speed to memory element speed ratio at the subsequent states. A first memory element is in the first set of memory elements at the first state and subsequent alternating states after the first state. The controller is further configured to: select a base memory element from the first set of memory elements at the first state, wherein the base memory element is a first memory element that will participate in arbitration; and update the base memory element, wherein the updated base memory element points to a unused memory element of the plurality of memory elements. The first and second host speed to memory element speed ratios are different. The controller is further configured to: determine at least one memory element of the plurality of memory elements that will participate in arbitration; calculate a host speed to memory element speed ratio; calculate a number of active memory elements, wherein the number of active memory elements is a number of memory elements equal to: a full bandwidth of a host or the total number or memory elements, the lower between the two; select the first set of memory elements of the plurality of memory elements at the first state from the at least one memory elements that will participate in arbitration, wherein the number of memory elements in the first set of memory elements is equal to the number of active memory elements; send data to the first set of memory elements; program the first set of memory elements; and select a second set of memory elements at a second state. The controller is further configured to: determine a plurality of memory elements that will participate in arbitration; select the first set of memory elements at the first state from the plurality of memory elements that will participate in arbitration; send data to the first set of memory elements at a pre-determined interval; select the second set of memory elements at the second state, the second set of memory elements comprising at least one memory element not included in the first set of memory elements; send data to the second set of memory elements at the pre-determined interval; determine whether the plurality of memory elements that participated in arbitration are ready to be programed; and program the memory elements.

In another embodiment, a data storage device comprises: a memory device comprising a plurality of memory elements; and a controller coupled to the memory device, wherein the controller is configured to: determine at least one memory element of the plurality of memory elements that will participate in arbitration; calculate a host speed to memory element speed ratio; calculate a number of active memory elements, wherein the number of active memory elements is a number of memory elements equal to a full bandwidth of a host; select a first set of memory elements of the plurality of memory elements at a first state from the at least one memory element that will participate in arbitration, wherein the number of memory elements in the first set is equal to the number of active memory elements; send data to the first set of memory elements; program the first set of memory elements; and select a second set of memory elements at a second state. The second set of memory elements comprises at least one memory element not included in the first set of memory elements. The controller is further configured to select the second set of memory elements by exchanging at least one memory element used in the first set of memory elements for at least one unused memory element from the memory elements that will participate in arbitration. The number of active memory elements is less than the number of memory elements that will participate in arbitration. The controller is further configured to send data to the first set of memory elements and then program the first set of memory elements. The number of active memory elements is a number of memory elements equal to the lower of: the full bandwidth of the host, or the plurality of memory elements. The controller is further configured to: determine a base memory element at a first state, wherein the base memory element is a first memory element that will participate in arbitration; and update the base memory element, wherein the updated base memory element points to a first unused memory element of the plurality of memory elements.

In another embodiment, a data storage device comprises: means to store data; and a controller coupled to the means to store data, wherein the controller is configured to: determine a plurality of memory elements of the means to store data that will participate in arbitration; select a first set of memory elements at a first state from the plurality of memory elements that will participate in arbitration; send data to the first set of memory elements at a pre-determined interval; select a second set of memory elements at a second state from the plurality of memory elements, the second set of memory elements comprising at least one memory element not included in the first set of memory elements; send data to the second set of memory elements at the pre-determined interval; determine whether the plurality of memory elements that participated in arbitration are ready to be programed; and program the plurality of memory elements that participated in arbitration. A memory element is ready to be programmed after a predetermined amount of data is received by the memory element. The pre-determined interval is 4 KB.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device comprising a plurality of memory elements; and
a controller coupled to the memory device, wherein the controller is configured to:
determine that a plurality of memory elements will participate in a host limited memory device arbitration scheme, wherein the arbitration scheme comprises a transition state and a steady state, wherein the transition state comprises several time slots where the plurality of memory elements start to fill a pipeline, wherein a first time slot of the transition state comprises sending data at full host bandwidth to a memory element of the plurality of memory elements, wherein a second time slot of the transition state which is after the first time slot comprises sending data at half of the full host bandwidth to a memory element of the plurality of memory elements, and wherein a third time slot of the transition state which is after the second time slot comprises sending data at a third of the full host bandwidth to a memory element of the plurality of elements;
determine a first host speed to memory element speed ratio;
select a first set of memory elements of the plurality of memory elements at a first state based on the first host speed to memory element speed ratio;
determine a second host speed to memory element speed ratio; and
select a second set of memory elements of the plurality of memory elements at a second state based on the second host speed to memory element speed ratio, wherein the second set of memory elements is different from the first set of memory elements.

2. The data storage device of claim 1, wherein the memory elements are NAND.

3. The data storage device of claim 1, wherein the second set of memory elements interleaves the first set of memory elements.

4. The data storage device of claim 3, wherein the interleaving of the first set of memory elements is cyclical.

5. The data storage device of claim 1, wherein the controller is further configured to select sets of memory elements at subsequent states based on corresponding host speed to memory element speed ratio at the subsequent states.

6. The data storage device of claim 1, wherein a first memory element is in the first set of memory elements and the second set of memory elements.

7. The data storage device of claim 1, wherein the controller is further configured to:
select a base memory element from the first set of memory elements at the first state, wherein the base memory element is a first memory element that will participate in arbitration; and
update the base memory element, wherein the updated base memory element points to a unused memory element of the plurality of memory elements.

8. The data storage device of claim 1, wherein the first and second host speed to memory element speed ratios are different.

9. The data storage device of claim 1, wherein the controller is further configured to:

calculate a number of active memory elements, wherein the number of active memory elements is a number of memory elements equal to the total number or memory elements.

10. The data storage device of claim 1, wherein the controller is further configured to:
send data to the first set of memory elements at a pre-determined interval;
select the second set of memory elements at the second state, the second set of memory elements comprising at least one memory element not included in the first set of memory elements;
send data to the second set of memory elements at the pre-determined interval;
determine whether the plurality of memory elements that participated in arbitration are ready to be programed; and
program the memory elements.

11. A data storage device, comprising:
a memory device comprising a plurality of memory elements; and
a controller coupled to the memory device, wherein the controller is configured to:
determine at least one memory element of the plurality of memory elements that will participate in determine that a plurality of memory elements will participate in a host limited memory device arbitration scheme, wherein the arbitration scheme comprises a transition state and a steady state, wherein the transition state comprises several time slots where the plurality of memory elements start to fill a pipeline, wherein a first time slot of the transition state comprises sending data at full host bandwidth to a memory element of the plurality of memory elements, wherein a second time slot of the transition state which is after the first time slot comprises sending data at half of the full host bandwidth to a memory element of the plurality of memory elements, and wherein a third time slot of the transition state which is after the second time slot comprises sending data at a third of the full host bandwidth to a memory element of the plurality of elements;
calculate a host speed to memory element speed ratio;
calculate a number of active memory elements;
select a first set of memory elements of the plurality of memory elements at a first state from the at least one memory element that will participate in arbitration, wherein the number of memory elements in the first set is equal to the number of active memory elements;
send data to the first set of memory elements;
program the first set of memory elements; and
select a second set of memory elements at a second state.

12. The data storage device of claim 11, wherein the second set of memory elements comprises at least one memory element not included in the first set of memory elements.

13. The data storage device of claim 11, wherein the controller is further configured to select the second set of memory elements by exchanging at least one memory element used in the first set of memory elements for at least one unused memory element from the memory elements that will participate in arbitration.

14. The data storage device of claim 11, wherein the number of active memory elements is less than the number of memory elements that will participate in arbitration.

15. The data storage device of claim 11, wherein the controller is further configured to send data to the second set of memory elements and then program the second set of memory elements.

16. The data storage device of claim 11, wherein the number of active memory elements for the second set of memory element at the second state is a number of memory elements equal to:

the plurality of memory elements.

17. The data storage device of claim 11, wherein the controller is further configured to:

determine a base memory element at a first state, wherein the base memory element is a first memory element that will participate in arbitration; and update the base memory element, wherein the updated base memory element points to a first unused memory element of the plurality of memory elements.

18. A data storage device, comprising:

means to store data; and a controller coupled to the means to store data, wherein the controller is configured to:

determine a plurality of memory elements of the means to store data that will participate in a host limited memory device arbitration scheme, wherein the arbitration scheme comprises a transition state and a steady state, wherein the transition state comprises several time slots where the plurality of memory elements start to fill a pipeline, wherein a first time slot of the transition state comprises sending data at full host bandwidth to a memory element of the plurality of memory elements, wherein a second time slot of the transition state which is after the first time slot comprises sending data at half of the full host bandwidth to a memory element of the plurality of memory elements, and wherein a third time slot of the transition state which is after the second time slot comprises sending data at a third of the full host bandwidth to a memory element of the plurality of elements;

select a first set of memory elements at a first state from the plurality of memory elements that will participate in arbitration;

send data to the first set of memory elements at a pre-determined interval;

select a second set of memory elements at a second state from the plurality of memory elements, the second set of memory elements comprising at least one memory element not included in the first set of memory elements;

send data to the second set of memory elements at the pre-determined interval;

determine whether the plurality of memory elements that participated in arbitration are ready to be pro-gramed; and program the plurality of memory elements that partici-pated in arbitration.

19. The data storage device of claim 18, wherein a memory element is ready to be programmed after a prede-termined amount of data is received by the memory element.

20. The data storage device of claim 18, wherein the pre-determined interval is 4 KB.

\* \* \* \* \*